US012765539B1

(12) United States Patent
Wiesz

(10) Patent No.: US 12,765,539 B1
(45) Date of Patent: Oct. 20, 2026

(54) VERTICAL LIFT MOBILE STAND

(71) Applicant: Donavan Wiesz, Bowdon, ND (US)

(72) Inventor: Donavan Wiesz, Bowdon, ND (US)

( * ) Notice: Subject to any disclaimer, the term of this patent is extended or adjusted under 35 U.S.C. 154(b) by 0 days.

(21) Appl. No.: 19/293,703

(22) Filed: Aug. 7, 2025

(51) Int. Cl.

| | |
|---|---|
| ***A01M 31/02*** | (2006.01) |
| ***B62D 63/06*** | (2006.01) |
| ***B62D 63/08*** | (2006.01) |
| ***E04H 15/00*** | (2006.01) |

(52) U.S. Cl.
CPC ........... *A01M 31/02* (2013.01); *B62D 63/061* (2013.01); *B62D 63/08* (2013.01); *E04H 15/001* (2013.01)

(58) Field of Classification Search
CPC .... A01M 31/02; B62D 63/061; E04H 15/001; E04G 1/20; B66F 11/00
See application file for complete search history.

(56) References Cited

U.S. PATENT DOCUMENTS

| | | | | | |
|---|---|---|---|---|---|
| 1,031,818 | A * | 7/1912 | Putman | E06C 1/34 | 182/69.5 |
| 3,473,627 | A * | 10/1969 | Repka | E04G 1/28 | 182/16 |
| 3,882,964 | A * | 5/1975 | Schellenberg | B66F 11/04 | 182/127 |
| 4,719,716 | A * | 1/1988 | Chrisley, Jr. | A01M 31/025 | D25/16 |
| 5,295,555 | A * | 3/1994 | Strange | E06C 5/04 | 182/127 |
| 5,862,827 | A * | 1/1999 | Howze | E04H 15/001 | 135/900 |
| 6,347,684 | B1 * | 2/2002 | Fath | A01M 31/02 | 182/127 |
| 6,460,653 | B1 * | 10/2002 | Hardy | B60P 1/02 | 182/69.5 |
| 6,523,641 | B2 * | 2/2003 | Smith | A01M 31/02 | 182/127 |
| 6,637,549 | B1 * | 10/2003 | Lopacki | A01M 31/02 | 182/115 |
| 6,659,496 | B1 * | 12/2003 | Wilson | B60P 3/0252 | 414/469 |
| 6,789,829 | B1 * | 9/2004 | Kapels | B62D 63/061 | 296/11 |
| 6,945,743 | B2 * | 9/2005 | Sherman | E04H 15/001 | 414/476 |

(Continued)

FOREIGN PATENT DOCUMENTS

| | | | | |
|---|---|---|---|---|
| CA | 3006880 C | * | 4/2020 | A01M 31/025 |
| DE | 2709904 A | * | 9/1978 | |

(Continued)

*Primary Examiner* — Jessica L Laux
*Assistant Examiner* — Kathleen M. McFarland
(74) *Attorney, Agent, or Firm* — Fargo Patent & Business Law; Thomas Kading

(57) ABSTRACT

A mobile stand includes a wheeled frame; a platform; and a lift system mounted to the platform and the wheeled frame, the lift system operable to vertically move the platform with respect to the wheeled frame between a lowered position and a raised position, the lift system comprises a multiple of posts arranged vertically with respect to the wheeled frame, the platform slidable along the posts between the lowered position adjacent to a chassis of the wheeled frame and the raised position vertically displaced from the chassis.

5 Claims, 6 Drawing Sheets

(56) References Cited

U.S. PATENT DOCUMENTS

| | | | | |
|---|---|---|---|---|
| 6,978,862 | B1 * | 12/2005 | Cotten, Sr. | A01M 31/025 182/127 |
| 7,014,238 | B2 * | 3/2006 | Gonzalez | B60P 1/02 296/26.05 |
| D519,647 | S * | 4/2006 | Watson | D25/62 |
| 7,055,878 | B2 * | 6/2006 | Imhof | B60P 3/07 296/26.07 |
| 7,104,360 | B2 * | 9/2006 | Atkins | E06C 5/04 182/69.2 |
| 7,150,466 | B1 * | 12/2006 | Chapman | B62D 63/061 280/37 |
| 7,726,446 | B1 * | 6/2010 | Buchanan | A01M 31/025 182/127 |
| 7,735,605 | B2 * | 6/2010 | Davis | E06C 5/02 182/64.1 |
| 7,815,015 | B2 * | 10/2010 | Kerns | A01M 31/025 296/26.05 |
| 7,967,325 | B1 * | 6/2011 | Burton | E06C 5/04 280/47.24 |
| 8,151,934 | B2 * | 4/2012 | Kirby | A01M 31/02 182/127 |
| 8,256,794 | B1 * | 9/2012 | Burton | A01M 31/02 280/47.131 |
| 8,376,083 | B1 * | 2/2013 | Dawes | E06C 5/04 182/127 |
| 8,444,174 | B1 * | 5/2013 | Miller, Jr. | E04H 15/001 182/63.1 |
| 8,777,254 | B1 * | 7/2014 | Fowler | A01M 31/02 280/656 |
| 9,630,666 | B1 * | 4/2017 | Keene | B62D 63/061 |
| 10,414,322 | B1 * | 9/2019 | Coulter | B62D 63/064 |
| 10,602,738 | B2 * | 3/2020 | McLeod | A01M 31/025 |
| 10,633,234 | B2 * | 4/2020 | Meyer | A01M 31/02 |
| 11,052,812 | B2 * | 7/2021 | Coulter | B62D 33/0207 |
| D945,932 | S * | 3/2022 | Jungers | D12/101 |
| 11,751,562 | B1 * | 9/2023 | Kohler | B62D 63/06 182/116 |
| 2002/0139613 | A1 * | 10/2002 | Hardy | B60P 1/02 182/63.1 |
| 2002/0157899 | A1 * | 10/2002 | Smith | A01M 31/02 182/127 |
| 2003/0000769 | A1 * | 1/2003 | Pyle | E06C 1/39 182/127 |
| 2003/0051942 | A1 * | 3/2003 | Atkins | E06C 5/04 182/127 |
| 2003/0178251 | A1 * | 9/2003 | Hewitt | A01M 31/02 182/127 |
| 2004/0018075 | A1 * | 1/2004 | Sherman | B62D 63/061 414/476 |
| 2004/0083660 | A1 * | 5/2004 | Atkins | A01M 31/02 135/900 |
| 2005/0194807 | A1 * | 9/2005 | Gonzalez | B60P 1/02 296/26.05 |
| 2006/0086569 | A1 * | 4/2006 | Brown, Sr. | A01M 31/02 182/63.1 |
| 2006/0162999 | A1 * | 7/2006 | Atkins | E06C 5/04 182/63.1 |
| 2007/0029136 | A1 * | 2/2007 | Kirby | A01M 31/02 182/63.1 |
| 2007/0045046 | A1 * | 3/2007 | Hayes | A01M 31/02 182/63.1 |
| 2007/0080508 | A1 * | 4/2007 | Owens | B62D 63/061 280/1 |
| 2007/0235255 | A1 * | 10/2007 | Wallace | A01M 31/02 182/20 |
| 2008/0302602 | A1 * | 12/2008 | Schultz | B66F 11/04 182/69.4 |
| 2008/0307717 | A1 * | 12/2008 | Heppner | B60P 1/045 52/64 |
| 2009/0107762 | A1 * | 4/2009 | Davis | E06C 5/02 182/63.1 |
| 2009/0236179 | A1 * | 9/2009 | Lopez | A01M 31/02 182/63.1 |
| 2011/0101719 | A1 * | 5/2011 | James | B60J 7/165 296/26.04 |
| 2017/0105405 | A1 * | 4/2017 | Decker | E04H 15/001 |
| 2018/0132477 | A1 * | 5/2018 | Yelle | A01M 31/02 |
| 2018/0141797 | A1 * | 5/2018 | Meyer | A63G 31/10 |
| 2019/0351807 | A1 * | 11/2019 | Coulter | B60P 3/34 |
| 2019/0364879 | A1 * | 12/2019 | McLeod | A01M 31/025 |

FOREIGN PATENT DOCUMENTS

| | | | | |
|---|---|---|---|---|
| DE | 2709904 | A1 | 9/1978 | |
| DE | 20102865 | U1 * | 7/2001 | A01M 31/02 |

* cited by examiner

VERTICAL LIFT MOBILE STAND

CROSS REFERENCE TO RELATED APPLICATION[S]

None

BACKGROUND

The present disclosure relates to a mobile stand, and more specifically to a vertical lift mobile stand that may be occupied during elevation and depression.

Various conventional hunting blinds are mobile and erectable at a dispersed location. Such blinds are of various configurations but typically require significant time and manpower to erect and remove. Furthermore, one may only enter the hunting blind after it is erected such as via a ladder.

This background section is intended to introduce the reader to various aspects of art that may be related to various aspects of the present disclosure, which are described and/or claimed below. This discussion is believed to assist the reader with background information to facilitate a better understanding of the various aspects of the present disclosure. Accordingly, it should be understood that these statements are to be read in this light, and not as admissions of prior art.

SUMMARY

A mobile stand according to one disclosed non-limiting embodiment of the present disclosure includes a wheeled frame; a platform; and a lift system mounted to the platform and the wheeled frame, the lift system operable to vertically move the platform with respect to the wheeled frame between a lowered position and a raised position, the lift system comprises a multiple of posts arranged vertically with respect to the wheeled frame, the platform slidable along the posts between the lowered position adjacent to a chassis of the wheeled frame and the raised position vertically displaced from the chassis.

A further embodiment of any of the foregoing embodiments of the present disclosure includes an enclosure on the platform.

A further embodiment of any of the foregoing embodiments of the present disclosure includes that the each of the multiple of posts are square in cross-section.

A further embodiment of any of the foregoing embodiments of the present disclosure includes that the lift system comprises a pulley system.

A further embodiment of any of the foregoing embodiments of the present disclosure includes that the lift system comprises a multiple of cables, each cable terminating at a respective top plate of a respective one of the multiple of posts.

A further embodiment of any of the foregoing embodiments of the present disclosure includes that each of the multiple of cables terminate at a common cable plate connected to a winch.

A further embodiment of any of the foregoing embodiments of the present disclosure includes that the winch is remotely operated.

A further embodiment of any of the foregoing embodiments of the present disclosure includes that the winch is battery powered.

A further embodiment of any of the foregoing embodiments of the present disclosure includes a ramp system mounted to the wheeled frame, the ramp system movable between a stored position and a deployed position.

A further embodiment of any of the foregoing embodiments of the present disclosure includes a stabilizer system mounted to the wheeled frame.

A mobile stand according to one disclosed non-limiting embodiment of the present disclosure includes a wheeled frame; a ramp system mounted to the wheeled frame, the ramp system movable between a stored position and a deployed position; a platform; an enclosure mounted on the platform; and a lift system mounted to the platform and the wheeled frame, the lift system operable to vertically move the platform with respect to the wheeled frame between a lowered position and a raised position, wherein the lift system comprises a multiple of posts arranged vertically with respect to the wheeled frame, the platform slidable along the posts between the lowered position adjacent to a chassis of the wheeled frame and the raised position vertically displaced from the chassis.

A further embodiment of any of the foregoing embodiments of the present disclosure includes that each of the multiple of posts are square in cross-section.

A further embodiment of any of the foregoing embodiments of the present disclosure includes that the lift system comprises a pulley system.

A further embodiment of any of the foregoing embodiments of the present disclosure includes that the lift system comprises a multiple of cables, each cable terminating at a respective top plate of a respective one of the multiple of posts.

A further embodiment of any of the foregoing embodiments of the present disclosure includes that each of the multiple of cables terminate at a common cable plate connected to a winch.

A further embodiment of any of the foregoing embodiments of the present disclosure includes that the winch is remotely operated.

A further embodiment of any of the foregoing embodiments of the present disclosure includes that the winch is battery powered.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
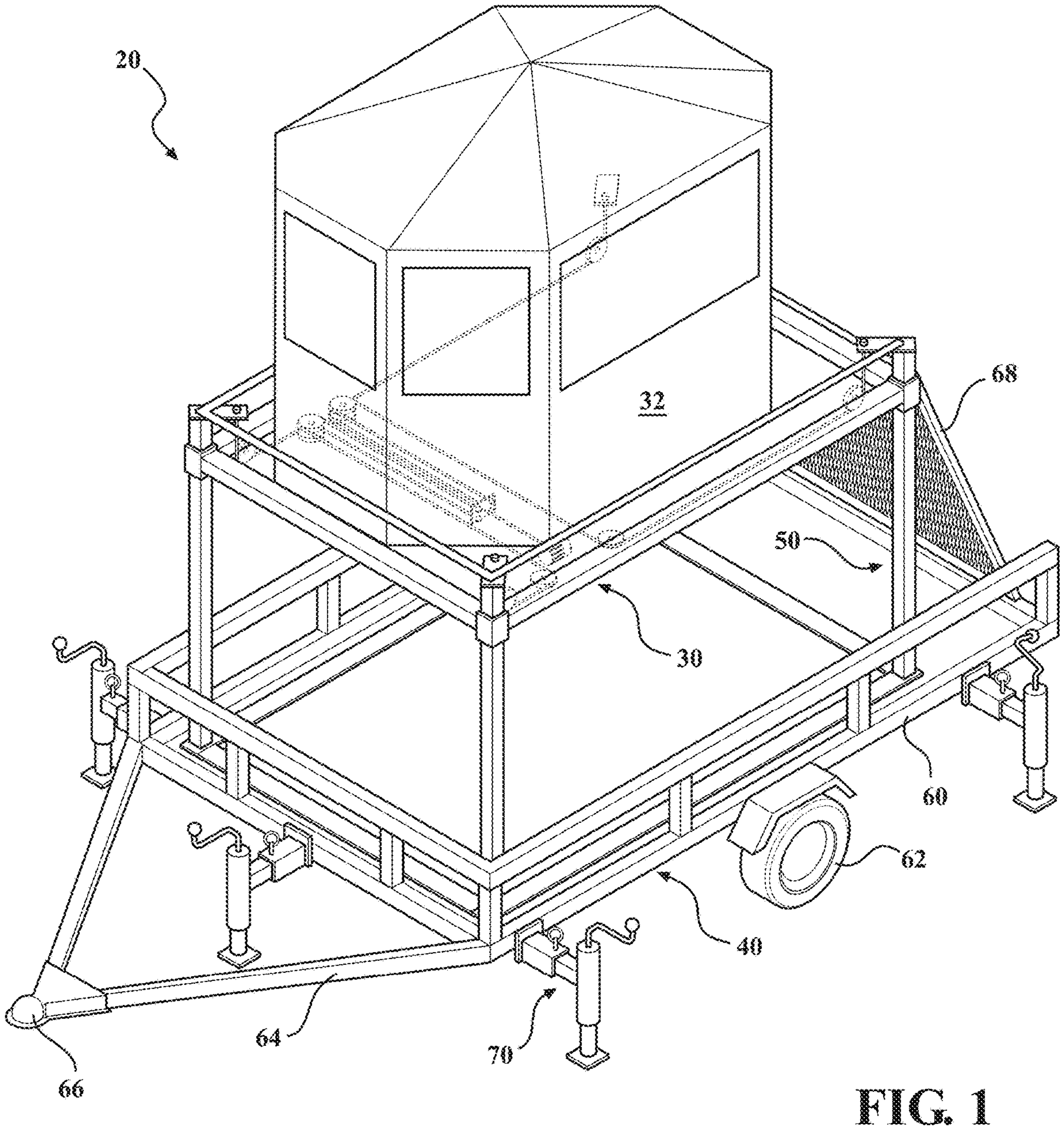
FIG. 1 is a schematic perspective view of a mobile stand according to one disclosed non-limiting embodiment.
Figure 2:
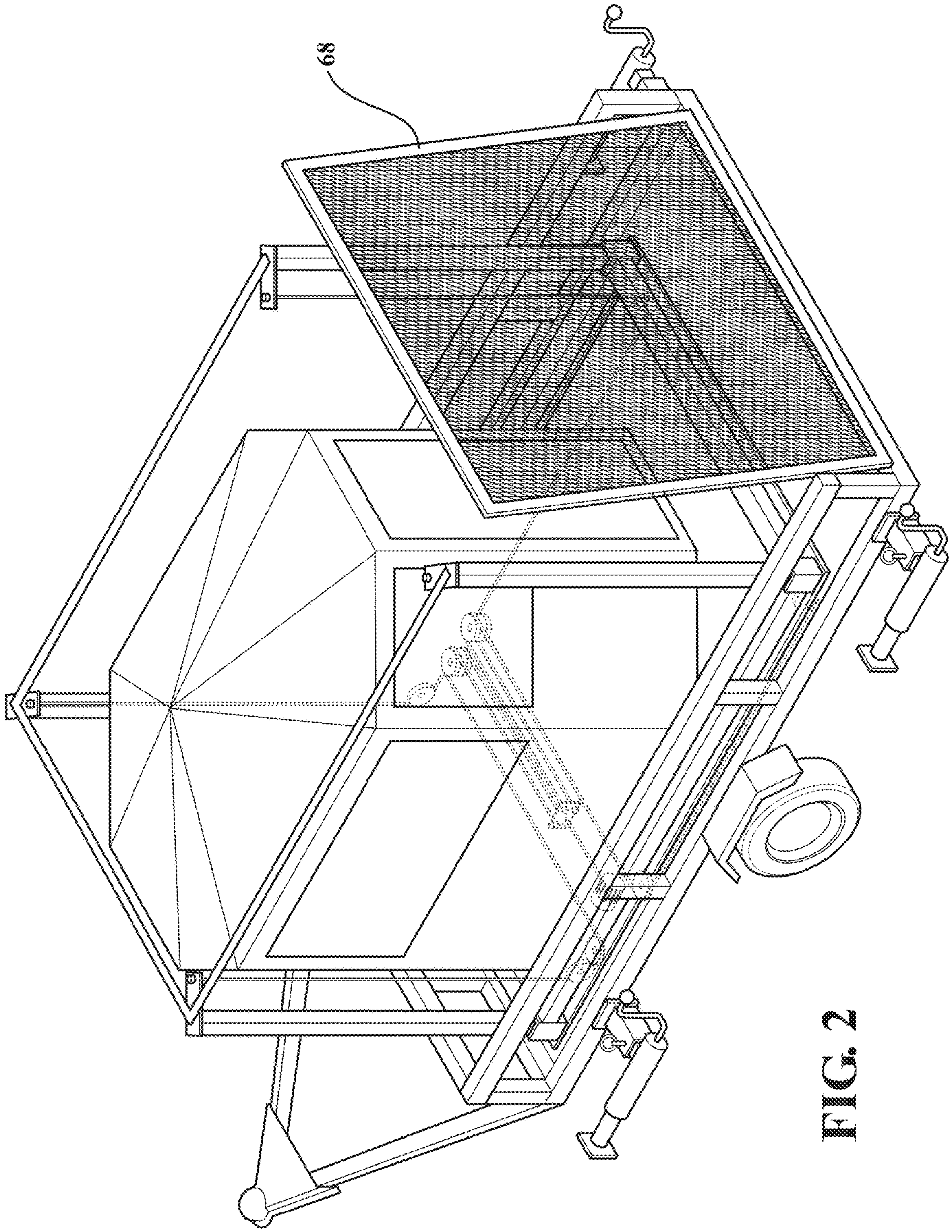
FIG. 2 is a schematic perspective view of the mobile stand in a lowered position for transport.
Figure 3:
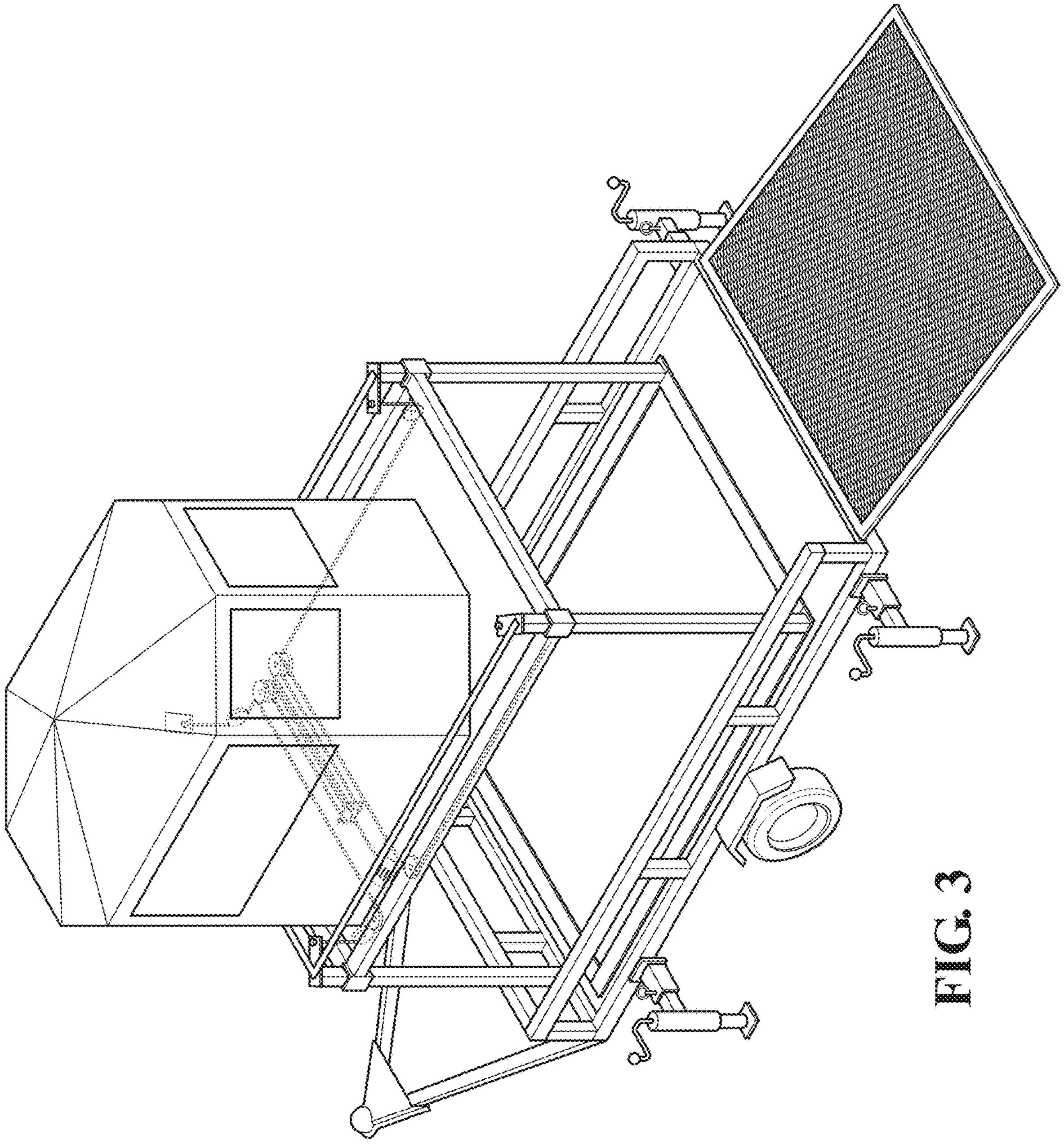
FIG. 3 is a schematic perspective view of the mobile stand in an elevated position.

FIG. 1 schematically illustrates a mobile stand 20 that generally includes a platform 30, a wheeled frame 40, and a lift system 50 therebetween. The platform 30, is vertically movable with respect to the wheeled frame 40 by the lift system 50 such that the platform 30 may be occupied during vertically movement of the platform 30 between a lowered position (FIG. 2) and a raised position (FIG. 3). In one embodiment, the platform 30 may be sized and configured to receive a wheelchair and/or other accessibility device. In other embodiments, the platform 30 may support various types of enclosures 32, e.g., hunting enclosures, observation enclosures, etc.

The wheeled frame 40, e.g., a trailer, may include a chassis 60 with a transverse wheeled axle 62 and a forwardly projecting trailer tongue 64 incorporating a ball hitch socket assembly 66 at a forward end section and a ramp 68 at a rear section. The ramp 68 is movable between a stored position and a deployed position to facilitate for example, wheel chair access. In one embodiment, the wheeled frame 40, may be a 3500-pound class type trailer. Although a particular trailer frame configuration is illustrated, it should be appreciated that other configurations may be utilized.

Figure 4:
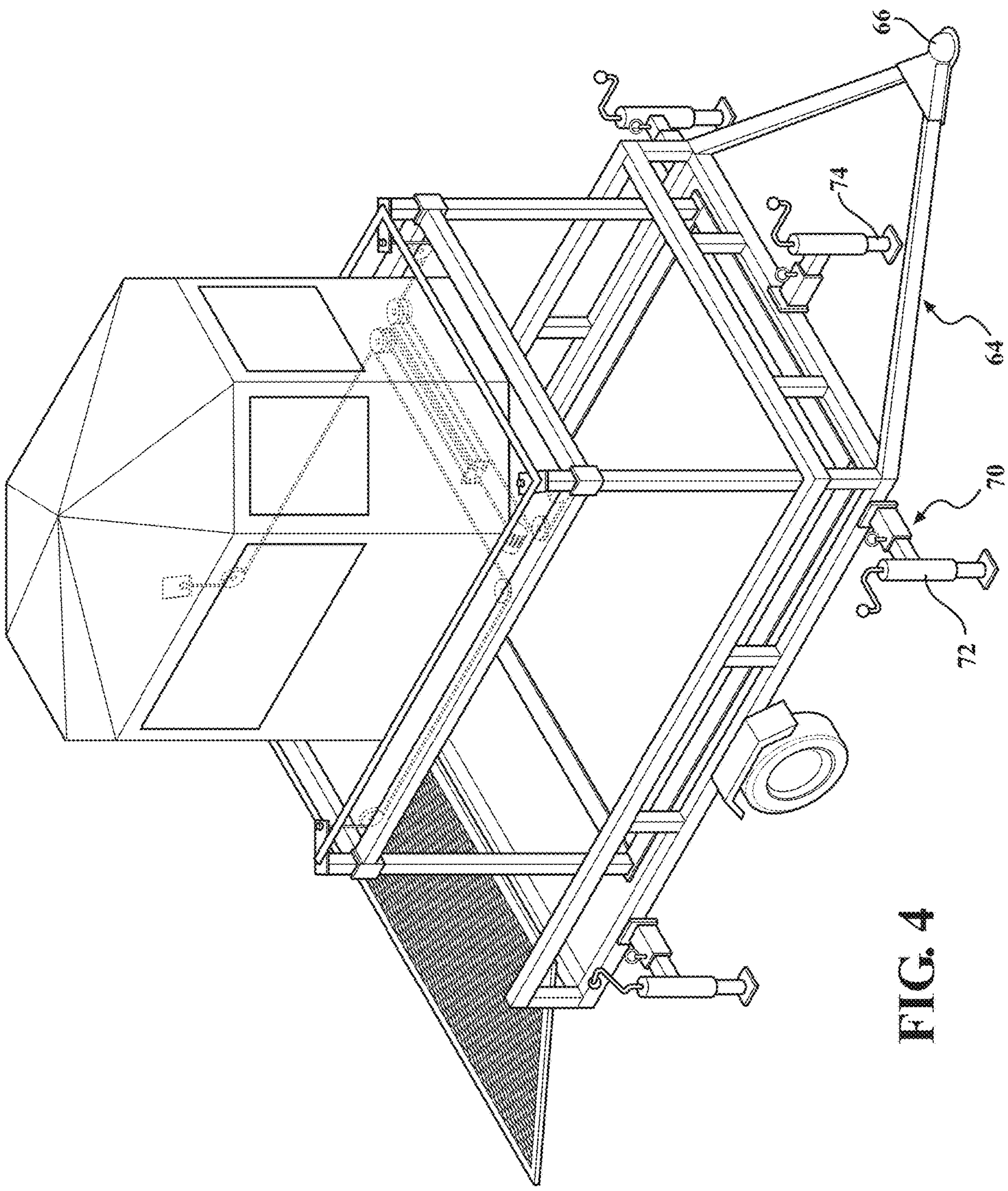
FIG. 4 is an expanded front perspective view of the mobile stand.

With Reference to FIG. 4, the wheeled frame 40 may further include a stabilizer system 70 with leveling jacks 72 supported adjacent to each of the four corners of the chassis 60. In addition, the trailer tongue 64 may include a jack 74. The leveling jacks 72 as well as the jack 74 may be manually installed and or outwardly extendable and retractable leveling jacks. Each of the leveling jacks 72 may be removed to provide a travel position, or installed to provide a deployed position, e.g., perpendicular to the chassis 60 (FIG. 4). Alternatively, the leveling jacks 72 as well as the jack 74 may be manually and/or automatically deployed and retracted via a jack handle, electrics, hydraulics, etc.

Figure 5:
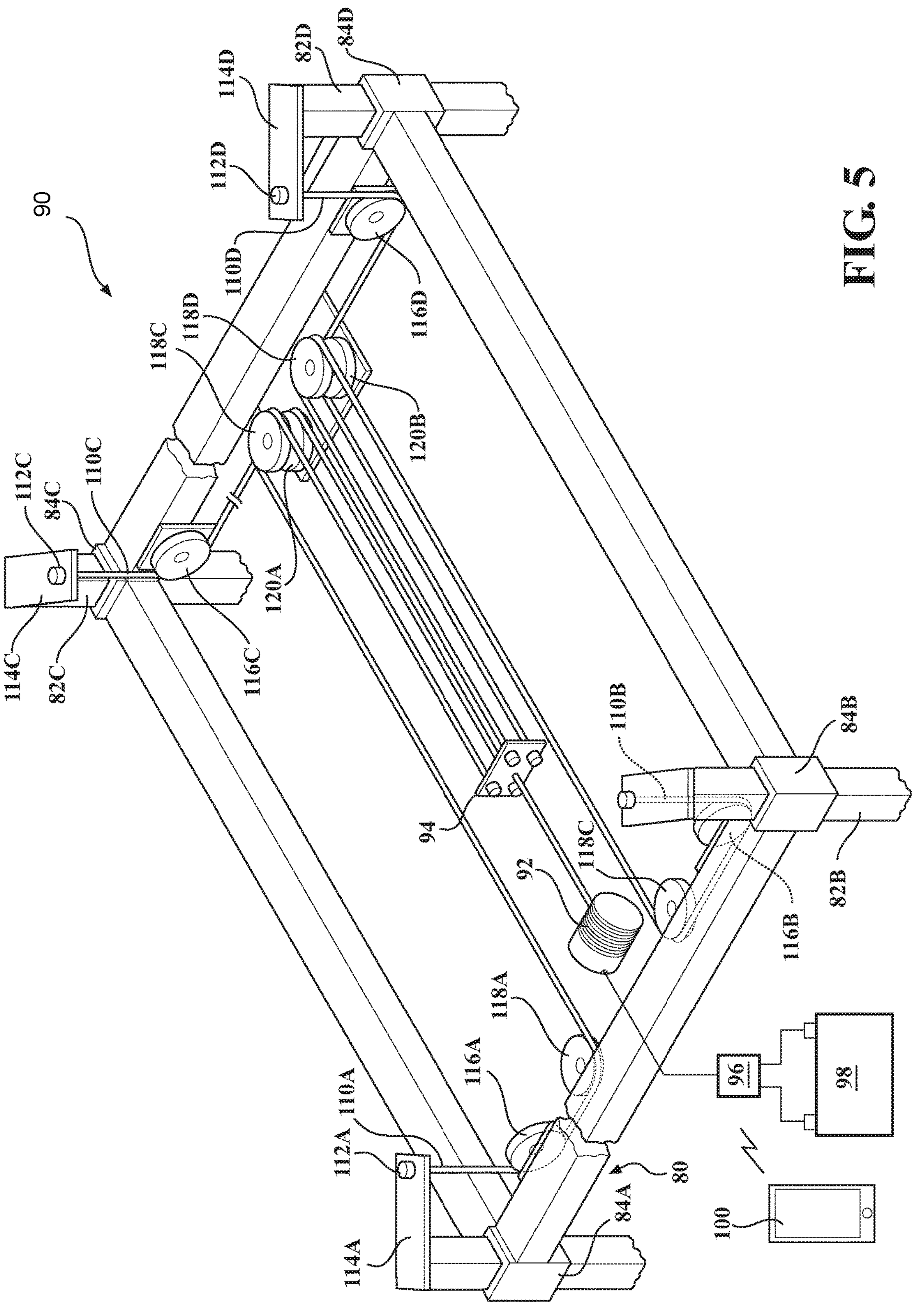
FIG. 5 is a schematic perspective view of the pulley system of the mobile stand.

With Reference to FIG. 5, the lift system 50 may generally support the platform 30 which is vertically movable along a set of posts 82 by a pulley system 90. In one embodiment, the posts 82 are 8-10 feet in height and may be taller than the enclosure 32 when the platform 80 is at the lowest position. Alternatively, no enclosure 32 may be provided and the platform 80 may be provided alone such that a user, such as hunter, may simply be perched on the bare platform 80. The platform 80 may include steel treadplate, wood, mesh, or other such decking upon which the enclosure 32 may be mounted.

In one embodiment, each of the posts 82 may be square in cross-section upon which a respective sleeve 84 slides. Each sleeve 84 may be mounted at a respective corner of the platform 80 so as to slide along the respective post 82 along a respective post axis A.

With reference to FIG. 4, the pulley system 90 may include a remote operated winch 92 that is operated by a control system 96. The winch 92 may be electrically powered by a battery 98, a generator, etc. The winch 92, control system 96 and battery 98 may be located adjacent to the trailer tongue 64 (best seen in FIG. 4).

The control system 96 may include a wireless remote 100 or may alternatively include a wired remote operable to remotely communicate with the winch 92. The wireless remote 100 may be utilized to control operation of the winch 92 and thus the height of the platform 80 from within the enclosure 32.

The remote 100 may provide for controls such as "up" and "down for gradual movement. Alternatively, or in addition, "one-button" preset control moments such as one-touch up; one-touch down, etc., may be provided for one or more predetermined heights. Other controls such a via an app, mobile computer, etc., may be utilized.

The control system 96 may include hardware, firmware, and/or software structures that are configured to perform the functions disclosed herein. While not specifically shown, the controller may include and/or communicate with other devices, e.g., the remote 100 to perform one or more of the disclosed functions. The control system 96 may include at least one processor, e.g., a controller, microprocessor, microcontroller, digital signal processor, etc., a memory, and an input/output (I/O) subsystem. The I/O subsystem typically includes, for example, an I/O controller, a memory controller, and one or more I/O ports. The processor and the I/O subsystem may be communicatively coupled to the memory. The memory may be embodied as any type of computer memory device (e.g., volatile memory such as various forms of random-access memory). The I/O subsystem may be communicatively coupled to hardware, firmware, and/or software structures.

In one embodiment, the winch 92 is connected to a common cable plate 94 to which a cable 110 from each post 82 is connected. The winch 92 winches the common cable plate 94 which in turn elevates and depresses the platform 80 via the pulley system 90.

Each cable 110 is attached at a fixed end 112 to a plate 114 atop the respective post 82 and travels to the common cable plate 94 via the pulley system 90. The pulley system 90 may include a winch side cable arrangement for the two posts 82A, 82B on the winch side and an opposite side cable arrangement for the two opposite posts 82D, 82E.

For each of the two posts 82A, 82B on the winch side, each cable 110A, 110B extends from the plate 114A, 114B along the respective post 82A, 82B in the Z-direction to a first pulley 116A, 116B mounted to the platform 80. The first pulley 116A, 116B is in the X-Z plane.

The cable 110A, 110B then travels along the platform 80 in the X-direction to a second pulley 118A, 118B. The second pulley 118A, 118B is in the X-Y plane. From the second pulley 118A, 118B, the cable 110A, 110B then travels in the Y-direction to a third pulley 120A, 120B on the opposite side of the platform 80. The third pulley 120A, 120B is in the X-Y plane. From the third pulley 120A, 120B, the cable reverses to the common cable plate 94 connected to the winch 92.

Figure 6:
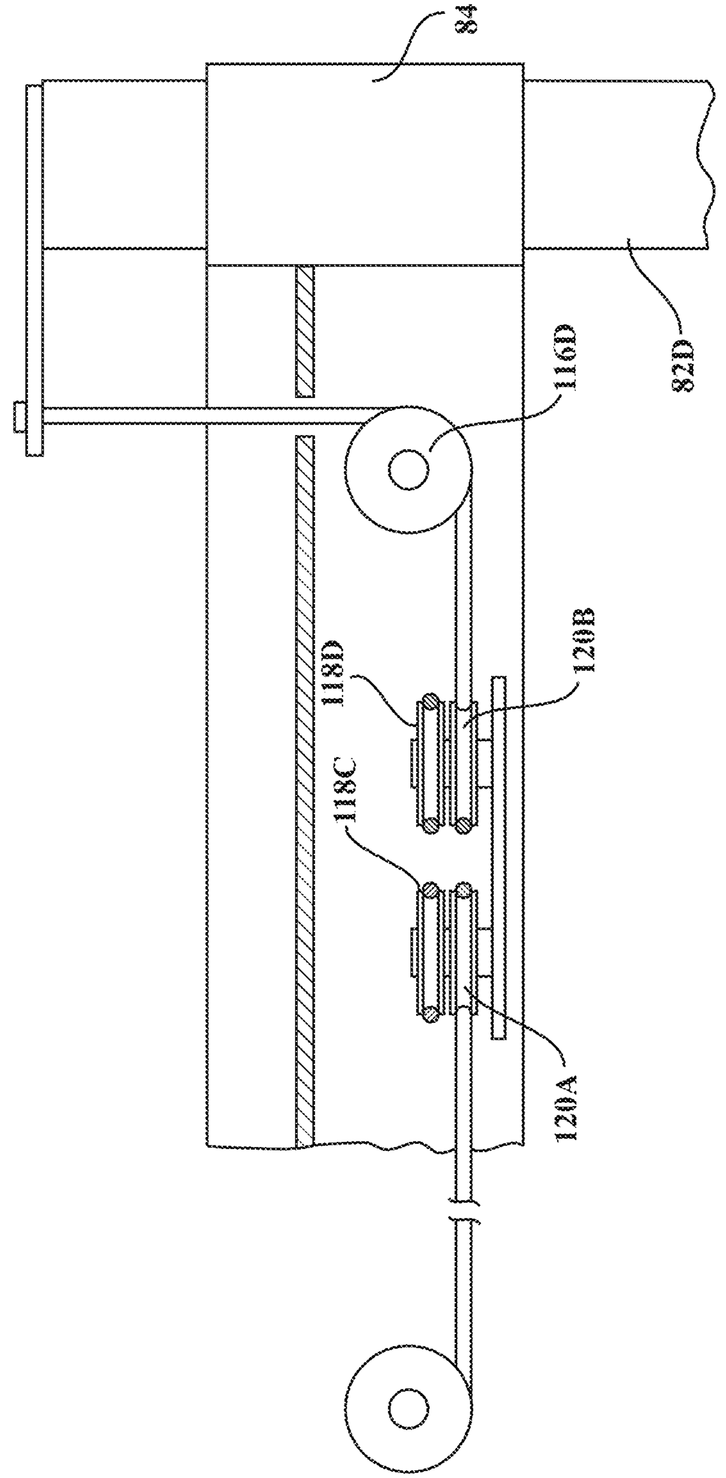
FIG. 6 is an expanded schematic perspective view of a pulley stack of the pulley system.

For each of the two posts 82C, 82D on the opposite side, each cable 110C, 110D extends from the plate 114C, 114D along the respective post 82C, 82D in the Z-direction to a first pulley 116C, 116D mounted to the platform 80. The first pulley 116C, 116D is in the X-Z plane. The cable 110C, 110D then travels along the platform 80 in the X-direction to a second pulley 118C, 118D. The second pulley 118C, 118D is in the X-Y plane and may be along the same axis as the third pulley 120A, 120B (FIG. 6). From the second pulley 118C, 118D, the cable 110C, 110D then travels to the common cable plate 94 connected to the winch 92. The single winch 92 thereby drives the multiple cables to provide safe and effective movement of the platform 30.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A mobile stand, comprising:

a wheeled frame;

a platform; and a lift system mounted to the platform and the wheeled frame, the lift system operable to vertically move the platform with respect to the wheeled frame between a lowered position and a raised position, the lift system comprises a multiple of posts arranged vertically with respect to the wheeled frame, the platform slidable along the posts between the lowered position adjacent to a chassis of the wheeled frame and the raised position vertically displaced from the chassis;

a remotely operated winch;

a pulley system which comprises a winch side cable arrangement for two posts of the multiple of posts on the winch side and an opposite side cable arrangement for the two opposite posts of the multiple of posts, wherein the pulley system comprises:

wherein for each of the two posts on the winch side, each cable extends from the respective top plate along the respective post in the Z-direction to a first pulley mounted to the platform, each first pulley in the X-Z plane, each cable then travels along the platform in the X-direction to a second pulley in the X-Y plane, from each second pulley each respective cable travels in the Y-direction to a third pulley on the opposite side of the platform, each third pulley in the X-Y plane, from the third pulley, each respective cable reverses to the common cable plate connected to the winch;

wherein for each of the two posts on the opposite side, each cable extends from the respective top plate along the respective post in the Z-direction to a first pulley mounted to the platform, the first pulley in the X-Z plane, then each respective cable travels along the platform in the X-direction to a second pulley, each second pulley in the X-Y plane, from each second pulley, each respective cable travels to the common cable plate connected to the winch; and a common cable plate to which a cable from each of the multiple of posts is connected, each cable terminating at a respective top plate of a respective one of the multiple of posts, the winch winches the common cable plate which in turn elevates and depresses the platform via the pulley system.

2. A mobile stand, comprising:

a wheeled frame;

a ramp system mounted to the wheeled frame, the ramp system movable between a stored position and a deployed position;

a platform;

an enclosure mounted on the platform;

a lift system mounted to the platform and the wheeled frame, the lift system operable to vertically move the platform with respect to the wheeled frame between a lowered position and a raised position, wherein the lift system comprises a multiple of posts arranged vertically with respect to the wheeled frame, the platform slidable along the posts between the lowered position adjacent to a chassis of the wheeled frame and the raised position vertically displaced from the chassis;

a remotely operated winch;

a battery to power the winch;

a common cable plate to which a cable from each of the multiple of posts is connected, each cable terminating at a respective top plate of a respective one of the multiple of posts, the winch winches the common cable plate which in turn elevates and depresses the platform via a pulley system, wherein the pulley system comprises a winch side cable arrangement for two posts of the multiple of posts on the winch side and an opposite side cable arrangement for the two opposite posts of the multiple of posts;

wherein for each of the two posts on the winch side, each cable extends from the respective top plate along the respective post in the Z-direction to a first pulley mounted to the platform, each first pulley in the X-Z plane, each cable then travels along the platform in the X-direction to a second pulley in the X-Y plane, from each second pulley each respective cable travels in the Y-direction to a third pulley on the opposite side of the platform, each third pulley in the X-Y plane, from the third pulley, each respective cable reverses to the common cable plate connected to the winch;

wherein for each of the two posts on the opposite side, each cable extends from the respective top plate along the respective post in the Z-direction to a first pulley mounted to the platform, the first pulley in the X-Z plane, then each respective cable travels along the platform in the X-direction to a second pulley, each second pulley in the X-Y plane, from each second pulley, each respective cable travels to the common cable plate connected to the winch.

3. The mobile stand as recited in claim 2, wherein the each of the multiple of posts are square in cross-section.

4. The mobile stand as recited in claim 1, wherein each second pulley in the X-Y plane is along the same axis as each third pulley.

5. The mobile stand as recited in claim 4, wherein a single winch drives four cables each of which terminate at the respective top plate of the respective one of the multiple of posts.

* * * * *